United States Patent Office 3,081,322
Patented Mar. 12, 1963

3,081,322
PRODUCTION OF N-ACYLATED P-AMINO PHENOL
David W. Young, Homewood, Ill., assignor, by mesne assignments, to Sinclair Research, Inc., New York, N.Y., a corporation of Delaware
No Drawing. Filed June 27, 1961, Ser. No. 119,841
4 Claims. (Cl. 260—404)

This invention relates to an improved method for preparing N-acyl-p-amino phenols. More particularly, this invention relates to the use of a novel catalyst in the preparation of high yields of light-colored N-acylated p-amino phenols.

In the past few years a new class of non-volatile antioxidants for petroleum products, greases, synthetic lubricants, plastic rubbers, resins, etc. has been developed. The materials may be called acylated p-amino phenols as a general class. The acyl-p-amino phenols, particularly the very low molecular weight members such as N-acetyl-p-amino phenol have also been found useful as a "short stop" in emulsion polymerization systems, for example, the formation of GR-S rubbers, polybutadiene, polyisoprene, etc. and as an analgesic additive in aspirin.

The acyl p-amino phenols are generally prepared by a condensation reaction which comprises heating a monocarboxylic acid or its anhydride in the presence of an entraining solvent such as benzene, toluene, xylene and the like, with para amino phenol. The solid reaction product is then dehydrated by evaporation. The present invention follows this general method of preparing N-acylated p-amino phenols but is directed toward the employment of novel catalysts for the condensation reaction.

One of the major problems with the above preparation is the color noted in the N-acylated p-amino phenol product. Whatever the cause, this coloration is particularly undesirable inasmuch as the N-acylated p-amino phenols are widely used in clear, colorless materials such as resins, plastics and the like and as analgesic additives in aspirins which require a high degree of purity. Accordingly, to eliminate the undesirable color, various methods of recrystallization, distillation and solvent extraction have been employed with varying degrees of success. But even where successful in producing a pure product such methods are time consuming and costly. It has been proposed in Patent 2,799,692 to Croxall et al. to eliminate this undesirable color by carrying out the condensation of the reactants in accordance with the generally employed method utilizing boric acid as a catalyst but blanketing the reactants in an atmosphere of sulfur dioxide. Although this method produces a pure product, the bulk density of the final product leaves much to be desired.

It has now been found that light-colored N-acylated p-amino phenols can be obtained by effecting the condensation of the p-amino phenol and a monocarboxylic acid in the presence of certain boron-containing organic compounds, preferably in an atmosphere of a non-oxidizing gas. Moreover, the products obtained by the method of the present invention can be of high density. The advantages of a product of increased density are, of course, that it lowers bulk and therefore reduces shipping costs; that it makes available the use of more different and less expensive types of filtering devices and that it increases the filtration rate.

The boron-containing organic compounds employed as a catalyst in the present invention can be illustrated by the following general formulas:

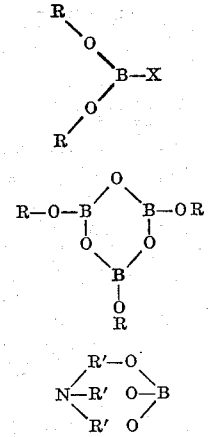

wherein R is hydrogen or a monovalent hydrocarbon radical, including substituted hydrocarbon radicals such as an oxygen-containing radical, e.g. ester radical, etc., of up to about 20 or 24 carbon atoms, preferably 1 to 6 carbon atoms, R' is a divalent aliphatic hydrocarbon radical of up to 6 carbon atoms, preferably 2 to 4, and X is —OR or R. R can be a straight or branch chained aliphatic, including cycloaliphatic, radical, an aryl group, e.g. phenyl, or a mixed alkyl-aryl radical but preferably is an alkyl radical, and R and R' can be substituted with non-inferfering groups. At least one of the R groups in the above general formulae is other than hydrogen. Examples of boron-containing organic compounds that may be employed are the aryl boronic acids, alkyl boric acids, trialkyl borates, trialkanol amine borates, trialkoxyboroximes, aryl dialkyl borates etc. The alkyl groups in these compounds preferably contain 1 to 6 carbon atoms. Suitable blanketing atmospheres for conducting the acylation of the present invention are non-oxidizing gases such as carbon dioxide, sulfur dioxide, nitrogen, hydrogen, etc. The best results are obtained, however, when hydrogen is employed as the blanketing atmosphere.

The catalysts of the present invention are employed in amounts sufficient to effect the N-acylation, generally they are utilized in catalytic amounts of up to about 5 weight percent on the combined weight of the reactants and entraining solvents and preferably in an amount of about 1–2 weight percent. The reaction temperature is normally up to about 200° C., preferably about 100 to 175° C.

In the practice of this invention, as in the prior art, the monocarboxylic acids having 2 to 21, preferably 12 to 18, carbon atoms are generally employed as the acid reactant. When the higher fatty acids containing upwards of 4 carbon atoms are used as the acid reactant, the corresponding N-acylated p-amino phenols possess greater solubility and therefore wider application as antioxidant additives in the various organic compositions that tend to gradually oxidize in storage. However, it will be appreciated that the exact nature of the acyl substituent does not effect the condensation of the acid with the amine. Oxo-acids and branched acids are less desirable from a reaction standpoint. In selecting the p-amino phenol substituent either the unsubstituted p-amino phenol or the nuclear substituted p-amino phenols are suitable reactants within the scope of this invention as are the substituted monocarboxylic acids.

The following examples will illustrate the use of the boron-containing organic compounds of the present invention as catalysts. Example I below was run under the same conditions as given in Example I of Patent No. 2,799,692 to Croxall et al. All the results listed in Example I of the patent were checked with the results of the run and were found to be accurate. For comparison, the acylation was similarly conducted but in the absence of a catalyst.

EXAMPLE I

A two-liter reaction flask was equipped with an anchor-type glass agitator, a Dean-Starke water trap carrying a condenser, a thermometer and a gas inlet tube for maintaining an atmosphere of $SO_2$ above the surface of the reaction mixture. The flask was charged with 109 g. (1.0 mole) of p-amino phenol, 200 g. of coconut fatty acid which was a mixture of $C_{10}$, $C_{12}$, $C_{14}$ and $C_{16}$ fatty acids lauric ($C_{12}$) acid predominating (the mixture having an acid number of 246.0 and a molecular weight of 228.0), 72 g. of toluene and 3.8 g. of powdered boric acid catalyst. The leg of the Dean-Starke trap was filled with 20 ml. of toluene and heating and agitation were started. A slow stream of sulfur dioxide was passed over the surface of the reactants. The charge was heated at 135–140° C., water being removed fairly rapidly at the beginning and more slowly as the reaction proceeded. A total of 18.5 ml. of water was collected in six hours.

The toluene was distilled at reduced pressure (15–20 mm.) and a maximum final temperature of 145° C. The residual melt was cooled slightly, and dissolved by adding 500 g. of 88% isopropanol. This solution was treated with 10 g. of activated powdered charcoal for 2½ hours at reflux; and filtered while still hot. An atmosphere of $SO_2$ was maintained throughout these operations. The charcoal coke was washed twice with 44 g. portions of hot 100% isopropanol. The filtrate and washings were transferred to a clean two-liter resin flask and diluted with 200 ml. of hot water. With agitation and gradual cooling under a continuous atmosphere of $SO_2$, the product was allowed to precipitate. At 58° C., the dropwise addition of 532 ml. of water was begun, being completed in about one hour. Cooling was applied by means of an ice-bath, the temperature of the mass falling to 15° C.

The supply of sulfur dioxide was then shut off and the product collected on a 5-inch centrifuge and washed with 50% by volume of cold aqueous isopropanol. The material was dried to constant weight in an oven at 60–75°. There was obtained 242 g. (83.2% of theory based on p-amino phenol), of a white powder having a melting point of 124–125° C. The run and density results are shown in Table I below.

EXAMPLE II

Example I above was conducted employing as catalysts the boron-containing organic compounds identified in Table I below and the blanketing atmosphere also indicated in Table I. The reaction rates and certain density determinations are shown in Table I below. In each case a white product was obtained.

*Table 1*

| Catalyst | Catalyst weight (g.) | Inert atmos. | $H_2O$ eliminated at reaction time of— | | | | | Density, g./100 cc. |
|---|---|---|---|---|---|---|---|---|
| | | | 2 hrs. | 3 hrs. | 4 hrs. | 5 hrs. | 6 hrs. | |
| None | 0.0 | $SO_2$ | | | | | | |
| $H_3BO_3$ (Ex. I) | 3.8 | $SO_2$ | 2.5 | 4.75 | 6.5 | 7.75 | 8.5 | 20.0 |
| Benzene boronic acid | 3.8 | Nitrogen | 7.0 | 11.5 | 14.0 | 15.5 | 18.5 16.75 | |
| 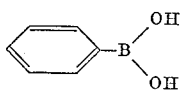 | | | | | | | | |
| Nonyl boric acid | 3.8 | do | 6.0 | 9.0 | 10.5 | 12.0 | 13.5 | |
| 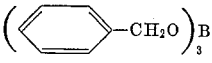 | 3.8 | do | 8.0 | 10.5 | 12.5 | 14.0 | 14.5 | |
| Tribenzyl borate | 3.8 | Hydrogen | 6.5 to 7.0 | 11.5 | 13.25 | | 15.0 | |
| 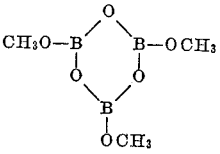 | | | | | | | | |
| Trimethoxyboroxime | 3.8 | do | 8.0 | 13.25 | 14.5 | 15.5 | | |
| 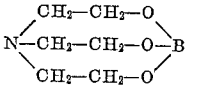 | | | | | | | | |
| Triethanolamine borate | [1] 3.8 | do | 3.0 | 5.5 | 8.0 | 9.5 | 10.5 | [2] 43.5 |
| 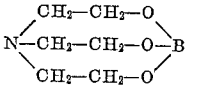 | | | | | | | | |
| 2,6-di-tert-butyl-4-methyl-phenyl-di-n-butyl borate | 3.8 10.0 | do do | 5.5 8.5 | 9.5 11.5 | 11.5 14.0 | 12.5 15.25 | 13.5 | |

See footnotes at end of table.

Table I—Continued

| Catalyst | Catalyst weight (g.) | Inert atmos. | H²O eliminated at reaction time of— | | | | | Density, g./100 cc. |
|---|---|---|---|---|---|---|---|---|
| | | | 2 hrs. | 3 hrs. | 4 hrs. | 5 hrs. | 6 hrs. | |
| 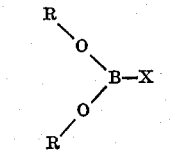 Tri-n-butylborate | 3.8<br>3.8<br>3.8 | Nitrogen<br>Hydrogen<br>Nitrogen | 9.0<br>7.0<br>8.0 | 13.7<br>10.5<br>12.0 | 16.0<br>13.0<br>14.0 | 16.7<br>14.2<br>15.0 | 17.0<br>14.5<br>15.5 | ² 44.8 |
| 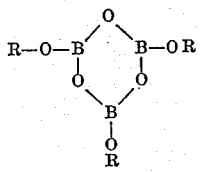 Tris-[3-2,2,4-trimethyl-pentyl-iso-butyrate)] borate | 3.8 | Hydrogen | 9 | 10.5 | 12.3 | 13.4 | 13.8 | ² 38 |

¹ Sublimed readily from reaction mixture, during reaction, reducing catalyst in vessel.
² Recrystallized from isopropanol.

Examination of Table I clearly shows the effectiveness of the boron-containing organic compounds of the present invention as catalysts in the N-acylation of p-amino phenol. Also shown is the product density advantages obtained by employing the catalysts of the present invention. All density determinations were made by first tapping the sample vessel several times.

It is claimed:

1. In a method for the production of N-acylated p-amino phenol by condensing p-amino phenol with a monocarboxylic acid of 2-21 carbon atoms, the improvement which comprises conducting the reaction in the presence of a catalytic amount of a boron-containing organic compound selected from the group consisting of

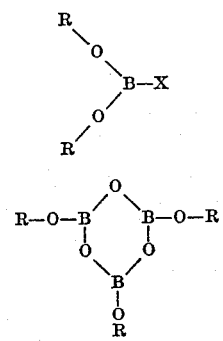

and

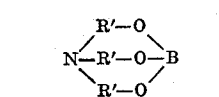

wherein R is selected from the group consisting of hydrogen and a monovalent hydrocarbon radical of up to 20 arbon atoms, R' is a divalent aliphatic hydrocarbon radical of up to 6 carbon atoms and X is selected from the group consisting of —OR and R and at least one R in the formulae is a monovalent hydrocarbon radical of up to 20 carbon atoms.

2. The method of claim 1 wherein R is a monovalent hydrocarbon radical of 1 to 6 carbon atoms.

3. In a method for the production of N-acylated p-amino phenol by condensing p-amino phenol with a monocarboxylic acid of 2 to 21 carbon atoms, the improvement which comprises conducting the reaction in the presence of a catalytic amount of a boron-containing organic compound selected from the group consisting of

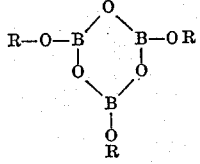

wherein R is selected from the group consisting of hydrogen, alkyl, aryl and mixed alkyl-aryl radicals of up to 20 carbon atoms, R' is a divalent saturated hydrocarbon radical of up to 6 carbon atoms and X is selected from the group consisting of OR and R, and at least one R in the formulae is selected from the group consisting of alkyl, aryl and mixed alkyl-aryl radicals of 1 to 20 carbon atoms.

4. The method of claim 3 wherein R is of 1 to 6 carbon atoms.

References Cited in the file of this patent

UNITED STATES PATENTS

| | | |
|---|---|---|
| 2,606,915 | Garbo | Aug. 12, 1952 |
| 2,822,370 | Cottle et al. | Feb. 4, 1958 |
| 2,898,353 | Schulze | Aug. 4, 1959 |